US006867683B2

(12) United States Patent
Calvesio et al.

(10) Patent No.: US 6,867,683 B2
(45) Date of Patent: Mar. 15, 2005

(54) HIGH SECURITY IDENTIFICATION SYSTEM FOR ENTRY TO MULTIPLE ZONES

(75) Inventors: Raymond V. Calvesio, Apple Valley, MN (US); John A. Olson, Eagan, MN (US)

(73) Assignee: Unisys Corporation, Blue Bell, PA (US)

( * ) Notice: Subject to any disclaimer, the term of this patent is extended or adjusted under 35 U.S.C. 154(b) by 610 days.

(21) Appl. No.: 09/750,394

(22) Filed: Dec. 28, 2000

(65) Prior Publication Data

US 2002/0149467 A1 Oct. 17, 2002

(51) Int. Cl.[7] .................................................. H04Q 1/00
(52) U.S. Cl. ........................................ 340/5.52; 340/5.7
(58) Field of Search ................................ 340/5.52, 5.66, 340/5.33, 5.31, 5.32, 572.1, 5.54, 5.83, 5.6

(56) References Cited

U.S. PATENT DOCUMENTS

| | | | | | |
|---|---|---|---|---|---|
| 4,213,038 | A | * | 7/1980 | Silverman et al. | 340/5.86 |
| 4,652,862 | A | * | 3/1987 | Verslycken | 340/5.3 |
| 4,760,393 | A | * | 7/1988 | Mauch | 340/5.54 |
| 4,972,476 | A | * | 11/1990 | Nathans | 340/5.83 |
| 4,993,068 | A | * | 2/1991 | Piosenka et al. | 340/5.83 |
| 5,260,551 | A | * | 11/1993 | Wiik et al. | 340/5.6 |
| 5,812,067 | A | * | 9/1998 | Bergholz et al. | 340/5.52 |
| 5,960,100 | A | * | 9/1999 | Hargrove | 340/5.53 |
| 6,229,445 | B1 | * | 5/2001 | Wack | 340/572.1 |

* cited by examiner

*Primary Examiner*—Brian Zimmerman
(74) *Attorney, Agent, or Firm*—Michael B. Atlass; Mark T. Starr

(57) ABSTRACT

Control over access by individuals to a group of high security facilities and zones within such facilities is accomplished with use of biometric readers at each access door as well as a quick ID reading device that is not required to contain biometric information. Enrollment at a secure facility where biometrics are maintained for each individual establishes a multipart data file for each individual, each part of which may be accessed by different actors in the system. The individuals allowed security to various facilities can only be in a single facility at a given time and also control their own schedule.

20 Claims, 10 Drawing Sheets

HIGH SECURITY IDENTIFICATION SYSTEM FOR ENTRY TO MULTIPLE ZONES

BACKGROUND OF THE INVENTION

1. Field of the Invention

This invention relates generally to computer system and biometric measurements to support the requirements of high security, limited access facilities such a government laboratories, situation rooms, and the like, as well as high security industrial laboratories and offices and the like.

2. Background Information

Numerous difficulties exist in policing the entries of high security facilities and there is a push to put technology to use in solving some of the problems and making the entries to such facilities more secure. Additionally, the quest to provide such services in a more user-friendly manner and a push to expand the usefulness of the overall security activities between facilities within a high security organization can be enhanced with resort to additional technologies being employed in inventive ways.

Such concerns loom large in an age where the potential for industrial espionage and terrorism abound. Governments and large corporations, particularly, want to be able to precisely control access to various facilities, while at the same time allow valuable workers to migrate easily between high security facilities with ease, if such movement is warranted. For example, if a researcher in one field needs to visit with another worker in a high technology laboratory across the country, if a system could facilitate that researcher's secure access to that other laboratory in a substantially, or fully automated manner, the speed and ease and cost of making such visits would be considerably enhanced.

Of additional concern is the stress placed on entrance guards who must decide whether to admit a person to a facility. Especially at times of high traffic, the human interactive access control methodologies used at the present time can break down or become less reliable. Too, the granularity of access can be enhanced with automation and biometrics so that various rooms within facilities can be more easily controlled with a heightened level of reliability if appropriate application of such technologies is employed.

Finally, the paperwork maintained for site access across a group of sites, each having their own individual requirements, can be burdensome. Employing the technologies discussed here as taught in this patent can reduce this cost.

In current practice, guards are relied upon to provide the first line of defense against fraudulent intrusion into secure facilities and for auxiliary purposes. It is not feasible or desirable for a guard to have access to schedules for people who may need to travel and work at more than one facility updated on a constant basis, even though such access could provide a higher level of site and personnel security.

With this invention a more positive identification can be established using a biometric card and biometric measurement at the secure facility, and even at a particular gate or door within such a facility, while facilitating record keeping of entry by that individual in a form immediately accessible to the appropriate authority.

There are a number of biometric systems available currently to provide relatively automatic identity checks. At least one system has described some kinds of access control using automatic biometric measurement. In the U.S. Patent issued to Mann et al., (U.S. Pat. No. 6,119,096, incorporated herein by this reference) a passenger can be said to be checked-in for a flight without use of cards or other identification based on biometric identification using an iris recognition system. There are many other ways to obtain biometric data besides the iris observation data collected by the Mann system, such as for example, using fingerprint checks (using something like the system described in U.S. Pat. No. 6,125,192, hereby also incorporated by this reference) voice checks, IR scans of body parts, hand shapes, movement characteristics, and so forth, any of which could be used together with other systems for redundancy, or alone, to confirm the identity of an individual presenting himself at a border crossing. (A patent describing the iris biometric measurement technology is U.S. Pat. No. 5,956,122, is also incorporated herein by this reference to provide further background information on the technology.) A recent patent issued to Pare, Jr. Et al., U.S. Pat. No. 6,154,879 details many of the potential types of biometric security currently available and uses them in a financial account access setting. This Pare, Jr. et al., patent is also incorporated by this reference herein in its entirety as well.

Still, there is no well understood system for facilitating the monitoring and automatic access granting at scheduled times to high security facilities, using ID tokens that do not require biometric data.

Numerous security schemes may be imagined based on the kinds of identity proofs currently available, however this invention provides additional security through the automatic coordination of various such components that is not found in the prior art.

SUMMARY OF THE INVENTION

Figure 1:
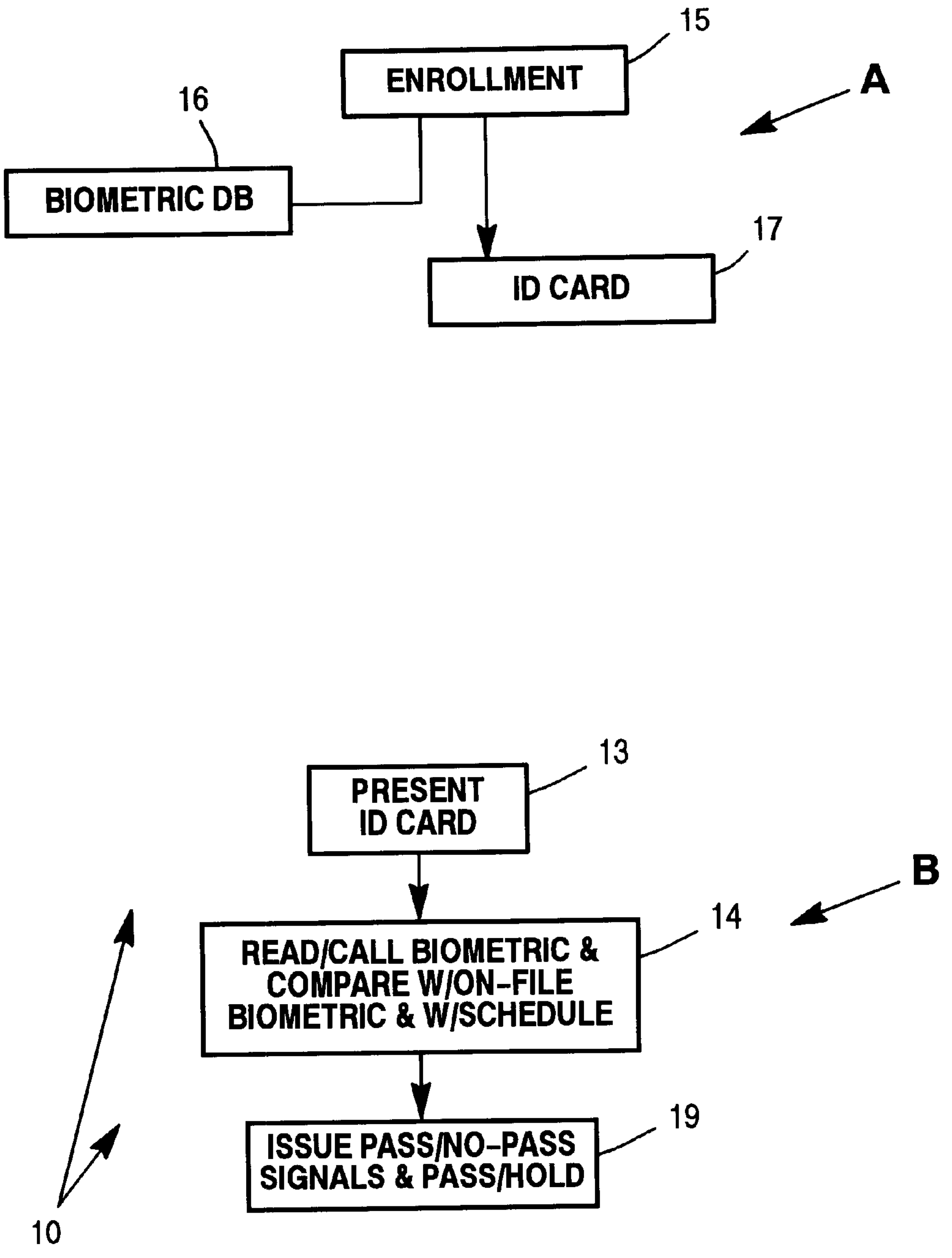
FIG. 1 is a flowchart pair of activities consistent with a preferred form of the invention.

With the objective of providing less expensive and more flexible secure access by individuals to a system of secure zones and facilities, the invention provides a systematic approach for access to facilities using a secure schedule for each individual and requiring reference to that schedule for access to any given door or gate within such a system.

A live biometric reading is required to verify that an individual is an appropriate individual to be at a given door and this data is checked against the schedule for this individual. Also, the biometric data is preferably checked against a secure database containing encrypted biometric data for all individuals with access to doors in the system. Although a secondary check against biometric data of an ID card is permitted, it is preferable that a card which can be quickly read is used by the individual and which contains an ID number for the individual rather than biometric data of any kind. This ID number is the key to the biometric data file for that individual at the centralized database.

Also, in some preferred embodiments the ID card can be replaced with an ID token of some other kind, or the ID card type can vary significantly. In some embodiments a quick scanning biometric can be used instead of an ID card as well. Details of these embodiments are mentioned in greater detail below.

The central database should be maintained and established by an enrollment authority which also has authorization control over individual schedules. The enrollment authority will have computer systems and programs for maintaining information and control over access to that information regarding the individuals in the centralized database. The individual schedules of time indicate for each individual when such an individual is permitted to be at any given zone within the secure system of zones and facilities. A usually separate employer authority provides additional access control over changes in the individual's schedule. Time and attendance reporting for individuals within the system can be automatically handled as an additional feature if desired.

By providing a detailed series of steps and procedures for changing the schedule, the ability of an individual to move from one zone to another can be handled automatically while a high level of security is maintained.

It should be recognized that in many of the preferred embodiment implementations, individuals can be either allowed or denied access to specific facilities and gates within them—regardless of the time, or day-of-week. Thus, when we talk about a "Scheduler" which keeps track of where the individual is allowed access, such a Scheduler can be as simple as one which merely holds a right of access value for a particular individual to a particular facility from the time such a right is granted until the time it is revoked by the appropriate authority and changed in the Scheduler. However, having such a program as a scheduler permits the ease of system use even with the added complexity of schedule-based date and time constraints involved in allowing individuals to update their own schedules. It should also be noted that individual access to modify rights to enter facilities is not a requirement for the functioning of the other features of the invention. Thus, the Scheduler is essentially a secure knowledge base relating access privileges of individuals to particular high security zones or the doors to such zones.

Checks and balances are also built into the system as described in detail below.

DETAILED DESCRIPTION OF THE PREFERRED EMBODIMENTS

Refer first to FIG. 1, in which an outline of the overall methodology is shown in flowchart form 10, including two (2) parts. The first part, A, is for enrollment and the second part B is for the actual pass-through using the identity card described in further detail within.

When an individual presents himself to a secured doorway, with an automatic biometric reader, he will present his identity card 13. The system will read the live biometric of the individual presenting the card and use information from the card to call up the enrollment biometric from a stored set of biometrics which should include this individual therein. Preferably, the set of stored biometrics will be accessible through a security system and programs available to a local decision-making computer that is near the access door. This access is accomplished through communications links to the security system and programs in the enrollment authority that are activated by the local computer that has been prompted by the request for passage.

The request for passage is typically initiated by the individual presenting his ID card at the door. Use of an ID card with a simple magnetic strip that is used by swiping through a magnetic strip reader is sufficient for this purpose since all that is required is an ID code or number from the card. This is because the individual's live biometric reading operates as the "key" to the door and the ID code will merely identify which archived biometric data file should be compared against the ID code on the card to determine a match. There are possible many variations on the type of card useable, including one containing a representation of a biometric which requires something like a SmartCard™ or LaserCard™ to be read by the ID card reader at the door, radio-frequency ID cards (called RFID cards) which can be read quickly on passing by them if a user merely has the card on him, and if a quick enough biometric reader is used, the live reading of a quick biometric could be used to produce a data file that can operate with the function of the ID code for finding the appropriate biometric data file for this individual presenting at the door way. Because of the simplicity and low cost of magnetic striped ID cards and mag-stripe readers, the presently preferred embodiment uses magnetic striped cards for the ID token and mag-stripe readers for to perform the initial ID function of the ID card reader device. To encompass all such devices for doing the initial finding of the ID code for the presenting individual we use the term "direct tentative identifier device."

If the on-file biometric matches the one presented by the individual and read by the biometric reader, a computer system will automatically decide to allow the individual to pass and issue a signal to the controlling equipment for the door or other means for controlling access. The signal 19 will be a pass, a no pass, or possibly a pass and hold or pass and monitor signal. The kind of signal 19 will be responsive to a decision making software entity within an associated computer that has access to all relevant and current data in a manner described below. In order to enable part B of process 10, all individuals will have to go through an enrollment process 15 in which a biometric database 16 is established that contains the identity biometric for each particular individual and relates it to an ID card number database 17.

Numerous advantages accrue in a system which retains a biometric database for heightening the security of a system whether it relates to a single facility or multiple facilities. Using an ID card or other token that by itself, preferably, contains no biometric data provides an additional reliability advantage in that the biometric data is not available outside the secured facilities. By mating the process B in Step 14 with a scheduling program, which tracks allowed locations for particular individuals, the ability to ensure security is again heightened. The maintenance of secure communications between the enrollment authority's database of biometric data and the local decision-making computers becomes an important aspect to the success of the system. Thus verification or other forms of security programs may be employed as front-end filters controlling access to the biometric databases, even in the case where dedicated lines may be installed between facilities and the enrollment authority's databases.

Figure 2:
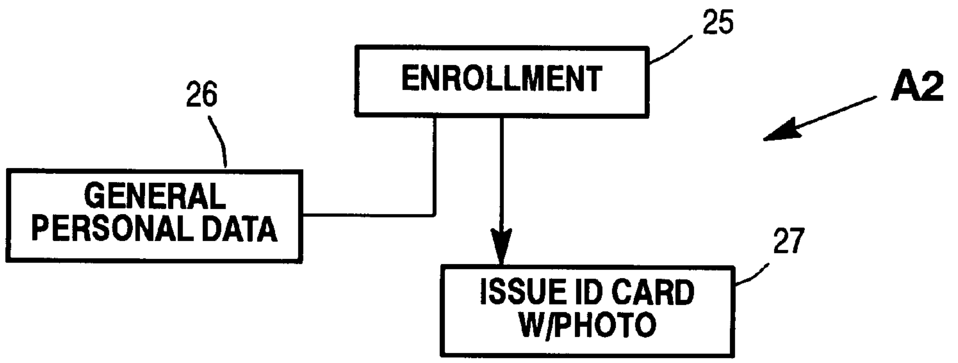
Figure 2 (Prior Art)
FIG. 2 is a flowchart of activities corresponding to prior art security systems.
Figure 2:
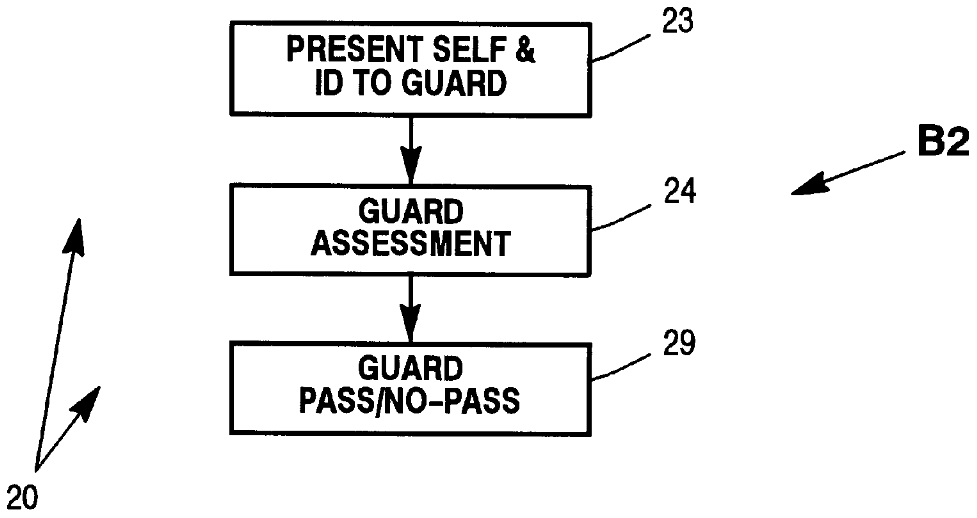
Figure 2 (Prior Art)

Refer to FIG. 2 in which a prior art form of security maintenance is outlined in a two-part flowchart 20. Here the enrollment process A2, 25 includes taking general characteristics and history data from the individual and establishing them in a database 26 and issuing an identity card preferably with a photograph 27 for the individual to present to a guard when used in a high security facility. In the high security facility the pass no-pass process B2 is handled. Here the individual and his ID card are presented to the guard at the same time Step 23. The guard makes an assessment 24 based on the presenting individual giving the guard an opportunity to ask questions if he doesn't recognize the individual and make decisions on the individual's demeanor and so forth in order to make a proper judgement. Obvious limitations to such guard assessment include lack of high familiarity with a large number of individuals, and difficulty in making accurate assessment when a large number of individuals are presented at a given moment in time all wishing to attempt to pass the checkpoint at the same or approximately the same instant.

Again, after a decision is made, here by the guard assessment in Step 24, a guard will allow or deny passage through the checkpoint in Step 29.

Clearly, many adjuvant measures and facilities may be present even in prior art security systems, however the flexibility and overall effectiveness of the combination of steps and facilities employed in the processes described herein, are not found in the prior art.

Figure 3:
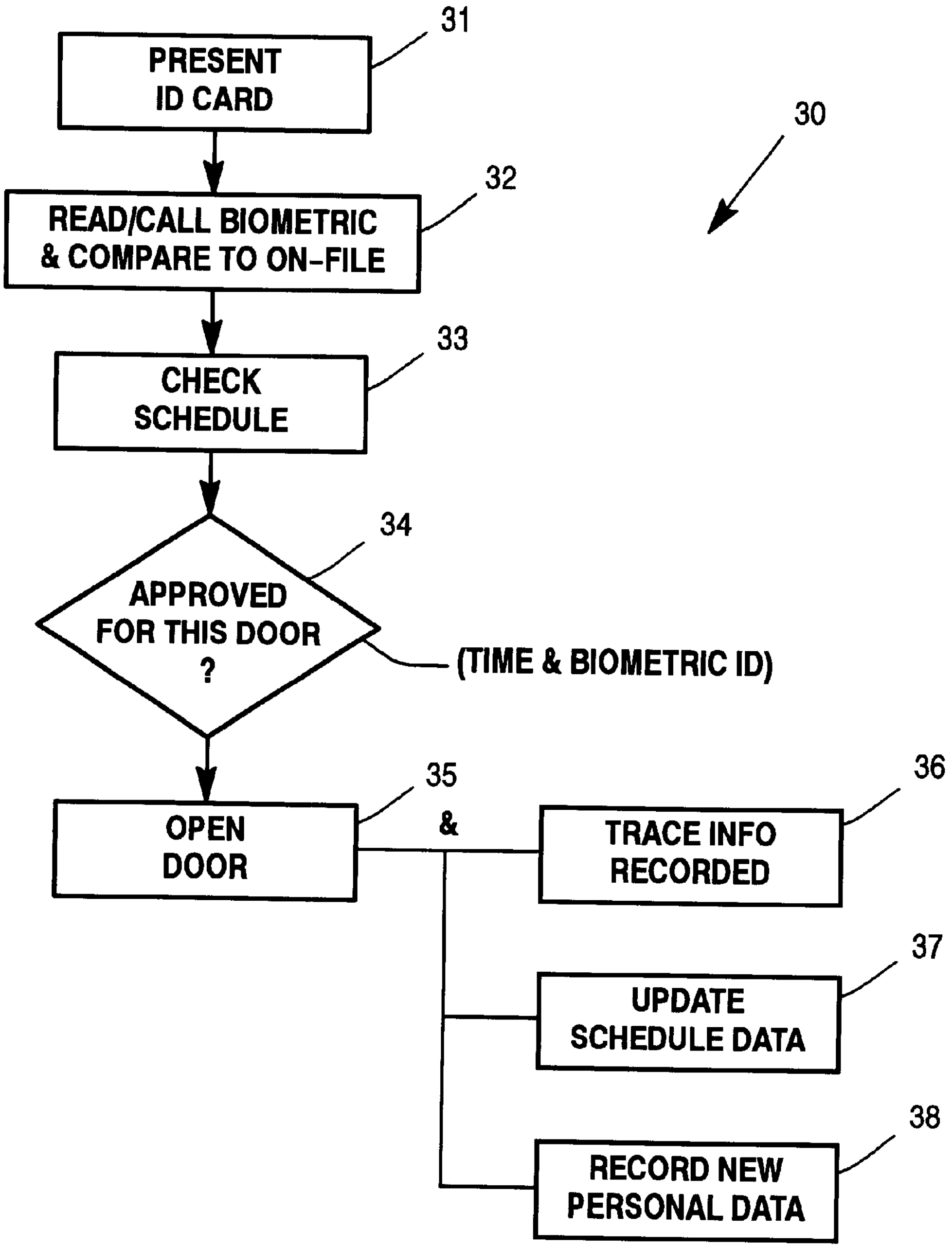
FIG. 3 is flowchart illustration indicating some enhancements to the flowchart of FIG. 1.

In FIG. 3, a flowchart 30 describes the inventive process for passing a secure doorway in more detail. In Step 31 the individual presents his ID card to a card reader at the secure facility. Again, as in FIG. 1, in Step 32 the card reader will read the card, make a call to the biometric database, and compare the biometric from the database to the individual by reading the same biometric from the individual at the secured door. Additionally, in Step 33, the inventive process requires checking with a Scheduler that electronically maintains an indication of where the particular individual that matches the biometric read in Step 32 is entitled to be under a security umbrella program in accord with this system. It is not essential that the Scheduler be located in the enrollment authority area, but it is preferred that this be so because the distribution of this information itself provides additional avenues for breaches of security.

If the individual is permitted to pass this particular door at this particular time based on his approved security schedule, he may be permitted to pass through the door. However, in Step 34, additional security measures may be taken. If the individual is approved to go through more than one security door at a given time and is approved for travel through this particular portal, the security system may also check to determine whether this individual is recorded as present in another location at the same time. Additional sensors or mechanisms may be provided such that only a single individual can pass through the given door at a time. Assuming all the checks have produced a positive result, the individual will be allowed to pass through the open door Step 35 and in preferred embodiments trace information will be recorded Step 36, the schedule will be updated Step 37 to indicate that this individual has proceeded through this particular door, and in Step 38 any new personal data may be recorded.

In Step 36, a trace information system may be monitoring the history of the movement of this particular individual and, if the authorities have flagged this individual as a person to be tracked, this gate traversal may be reported immediately to those authorities.

In Step 38, an up-to-date physical appearance/behavior profile may be kept for the individual by recording changes in appearance or habit. Such renewed recording of appearance data may be part of additional security routines enabled by this invention. These physical and/or behavioral changes could be noted by the guard and entered into a database through sending notes to the enrollment authority which could see that they were entered appropriately, or they can be entered directly by the guard if the guard is provided with a device to electronically make such entries. Alternatively, automatic systems like frame capture features of a camera in a biometric reader or mounted nearby can automatically record a person's appearance whenever he uses a security door to enter a zone, and this can be kept in a database. Such trace databases may be most conveniently organized and referenced by using the individual's ID number. Thus, it can be seen that the invention supports association of surveillance data acquired in conjunction with biometric admission, and perhaps more importantly, in conjunction with biometric denials.

Figure 4:
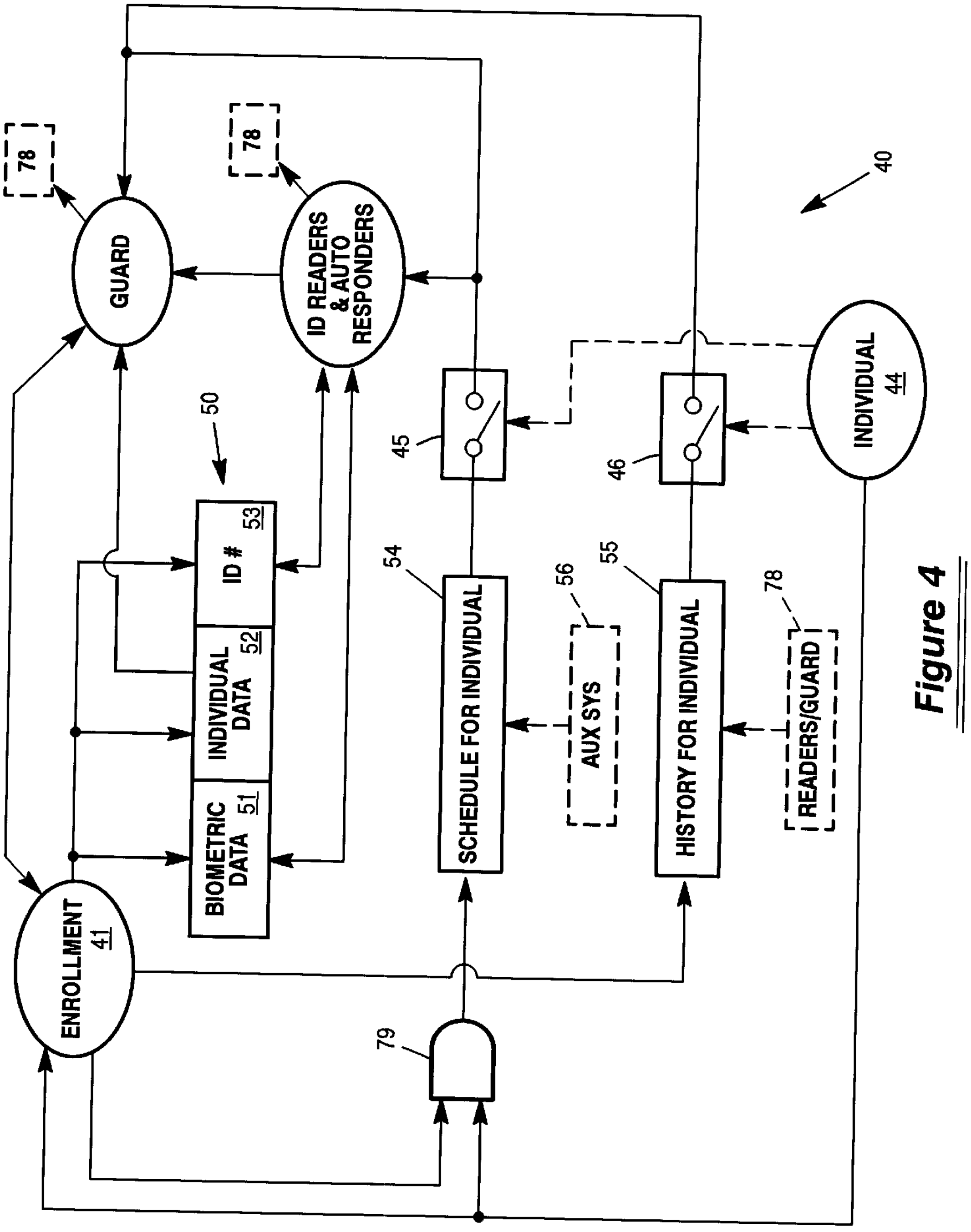
FIG. 4 is a block diagram indicating the manner of preferred data flow and access privileges in accord with the invention.

In FIG. 4, a block diagram 40 illustrates the components of the security system in a preferred form. The enrollment system, 41, will employ at least three databases 50, 54, and 55. In database 50, there will be biometric data taken by a biometric reader or scanner contained in a biometric database 51. Individual data including work experience, height, weight, color of hair, color of eyes, and other identifying traits of the individual that may be of interest to the authorities in the enrollment section will be recorded in a database 52. The ID numbers (or codes) in a database 53 will be correlated to information in databases 51 and 52, completing the minimum requirements for the database 50. Some of this data will be of interest to the guard 42 at the entrance to a facility, some of it to the ID badge readers (direct tentative identifier devices) and auto responders 43 at each portal or door within a secure facility, but all of it will be accessed through a system associated with establishing secure enrollment process 41.

The enrollment facility 41 will also establish a schedule database 54 for each individual 44. With the approval of the enrollment facility 79, preferably as described with reference to FIG. 11 below, the individual may have access to and actually modify his own schedule 54. Auxiliary events 56, such as special closings of a particular facility or zone, and/or auxiliary systems 56 if desired, may also directly affect the schedule database 54.

Individual provided data will not only be included in the individual database 52 of the overall database 50 maintained by enrollment facilities but may also be provided through the enrollment facility 41 to a history database 55 for the individual.

The history database 55 will track the comings and goings of the individual through the various security doors in the system. In some embodiments the guard may provide input into this history database. History information can be updated by the readers 43 and by guards 42 as shown here by block 78. Additionally, if the system is used to automate time reporting for the individuals, detail can be sent to a payroll computer system if desired. This detail can be used as the basis for time and attendance recording, pay, vacation accrual and the like by bookkeeping systems in the payroll computer system.

In order to ensure security for the individual and his data, approval processes 45 and 46 may be provided to the individual (here shown as dotted outline switches 45 and 46). This security feature will prevent the guard from discovering the schedule for the individual or the history of the individual as the individual presents himself to the guard 42 unless the individual permits it or if there is an enrollment system level override (not shown). The individual may exercise his control by giving an authorization code to the guard or punching in an authorization code on a keypad at the guard desk or in some other manner allow the guard to review such information.

Figure 5:
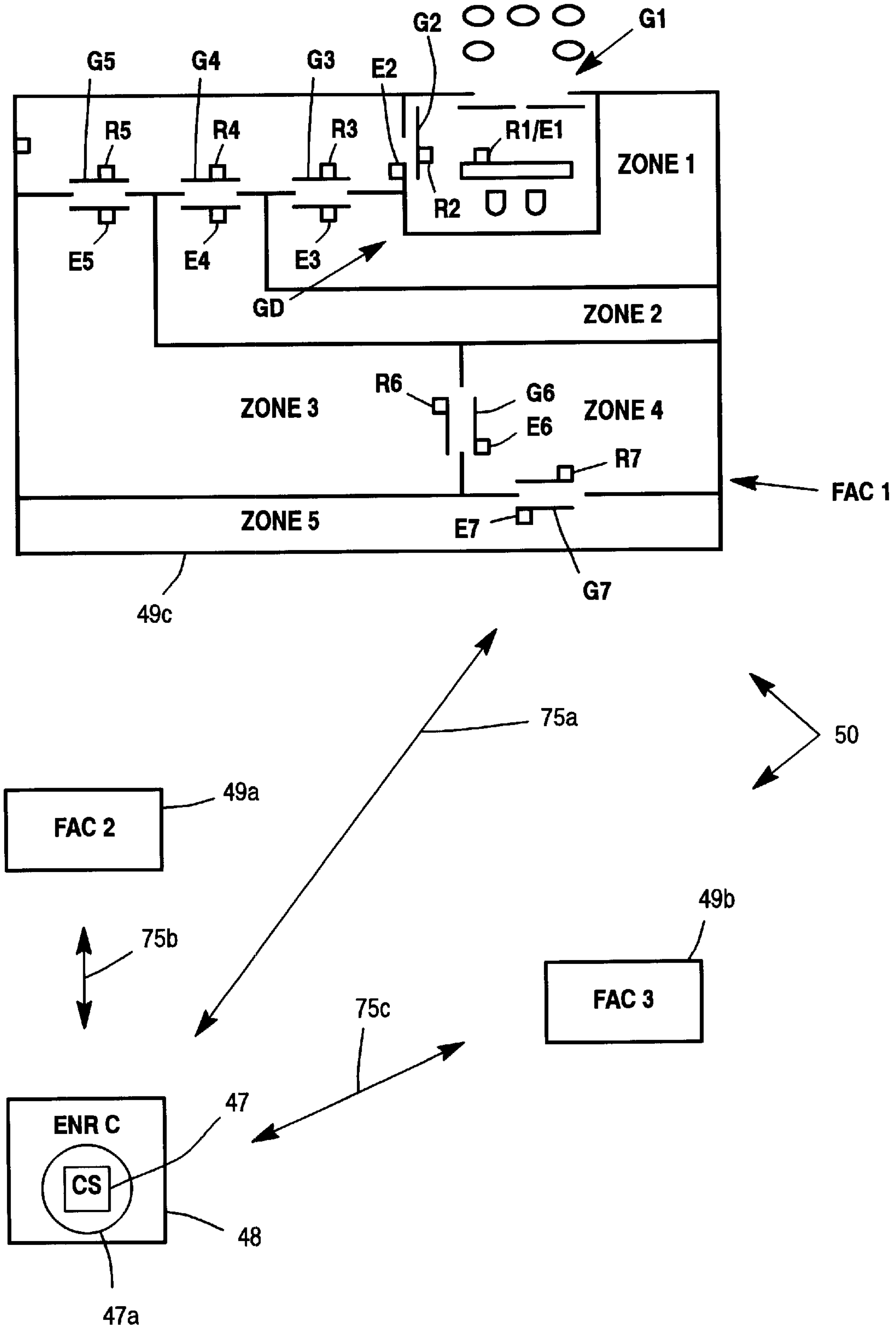
FIG. 5 is illustration of an implementation of this invention involving multiple facilities, and multiple zones within facilities in a real world situation.

In FIG. 5, a geographically disbursed set of facilities 50 is used to illustrate the functioning of the inventive system in a real world situation.

In the preferred embodiment, the enrollment center 48 and its computer system 47 communicates directly 75*a–c* with each of the facilities 49*a–c* and there is no inter-facility communication regarding the security access portals that directly controls the opening of these doors. The communications arrangement among the facilities could be distributed differently, however it is believed at the present time that this is the preferred arrangement for the highest level of security amongst a set of secure facilities using this invention. It may be advisable to further protect communications to ensure a secure communications path between the computer system that houses the data as part of the enrollment authority and the other facilities by maintaining a firewall of sorts, and other security programs, encryption, password protection and the like (47*a*) on any or all communications with the computer system where there is a possibility of tampering, or risk of false data being sent.

Focusing on a single facility (FAC1) 49*c*, note that the entrance to the facility is marked as G1. At the entrance is a guard desk GD with a card reader R1 to give the guard an opportunity to gain any information about this particular individual that he is entitled to review. The reader R1 may also include biometric reading facilities and an input mechanism, such as a keypad or touch pad display for example in order to enable the individual presenting himself to the guard to communicate directly with the system.

In some systems no guard will be required at all, but it is believed that a higher level of security will be maintained with a human guard and an arrangement such as shown in facility 49*c*.

At the next door G2 is a card reader R2 which will also be associated with a biometric measuring facility (not shown). There will be a computer end communications facility associated with each of the gates and with the card reader facility at the guard desk. Additional card readers and biometric measuring facilities are shown for facility 49*c* at gates G3–G7. In this particular facility, an individual must pass through gate G1, meet with the guards at the guard desk GD, and through G2 before he has access to any of the other gates for any of the zones within the facility. Zones 4 and 5 are hidden from workers who are only entitled to travel into Zones 1 and 2. Zone 5 is hidden also from workers enabled for travel into Zone 3 while workers in Zone 3 will also be aware of but not necessarily permitted into the facilities of Zone 4. Facilities 2 and 3, (FAC2 and FAC3) 49*a* and 49*b*, respectively, as well as the enrollment center 48 will have their own sets of zones and doors and all may be managed by this single system.

Special circumstances may require egress to be monitored by a set of similar equipment with biometric readers on the exit of the doors, however, in most facilities a mere card swipe should be satisfactory to keep tabs on the locations of the individuals who have already entered a particular zone or zones. The reader should be able to adapt the egress function to the security requirements of the facility. This is especially true with emergency egress such as during a fire or contamination event. In some nuclear facilities, it is possible that egress may be prohibited even at the cost of the lives of individuals in particular zones, but in general, a capability to override exit prohibitions should be built into the system for emergencies. In FAC1, egress card swipes E1–7 provide this functionality. (Note that these egress card swipes are only the currently preferred forms of a range of direct tentative identifier devices which can be substituted provided only that the substituted devices produce some kind of ID code for use in the database of biometric data files to locate the one for the particular presenting individual).

It should be recognized that there are several advantages to requiring both a card and live biometric comparison for admission as is done in this invention.

- In such systems, the card can serve as a manual backup to be examined by guards when any gate mechanism might fail.
- Employee photo-id badges are likely already in use anyway, so can be upgraded to serve as the biometrics access token too.
- High-tech badges could incorporate SmartCard technology to provide features such as an electronic purse—for vending machine and cafeteria purchases, etc.
- The badge scan/swipe alone can be used to satisfy signaling an exit from zones/facilities. This provides a fast and cost-effective means for updating the employee location without the expense of installing and implementing biometric scanning devices at exits. Competitor systems that advocate tokenless biometric access control would require biometric scanners at exits which are more costly and time consuming to use to provide the same functionality.

An examination of some of the data that will be contained in the databases described previously is enabled through review of FIG. 8. In the individual's scheduled data 801*a* for Monday, April 17, 801*b*, the ID code 802 may or may not be visible to the individual. The individual will understand that he is allowed admission to various facilities indicated in area 803. As shown here, this individual is allowed in facility one at doorways (or gates) G1, G3, G4, and G5. Times that individuals are allowed access to each zone behind each gate are also kept in this schedule. Here, in area 804 the individual is shown as being allowed into facility one FAC1 between 6:45 a.m. and 22:00 or 10:00 p.m. During this same timeframe, 6:45 to 22:00, the individual will also be allowed through gate G1, in other words, the guards (refer briefly back to FIG. 5, at GD in FAC1 49*c*) will see that he is entitled to be in the area between these hours. The individual will not be permitted to pass gate G3 until 6:50 and will be required to be outside of the zone protected by gate G3 by 21:58. This will enable the individual to pass through gates associated with entry and exit into and out of zones within the facility as required. Between 6:50 and 12:15, the schedule allows the individual to be in the zone protected by gate G4 (zone 2) and from 12:16 to 17:15, the individual is also permitted to be in the zone protected by gate G5 (zone 3) in FIG. 5. Note that this individual is not permitted to travel into zone 4, zone 5 or zone 2.

Figure 8:
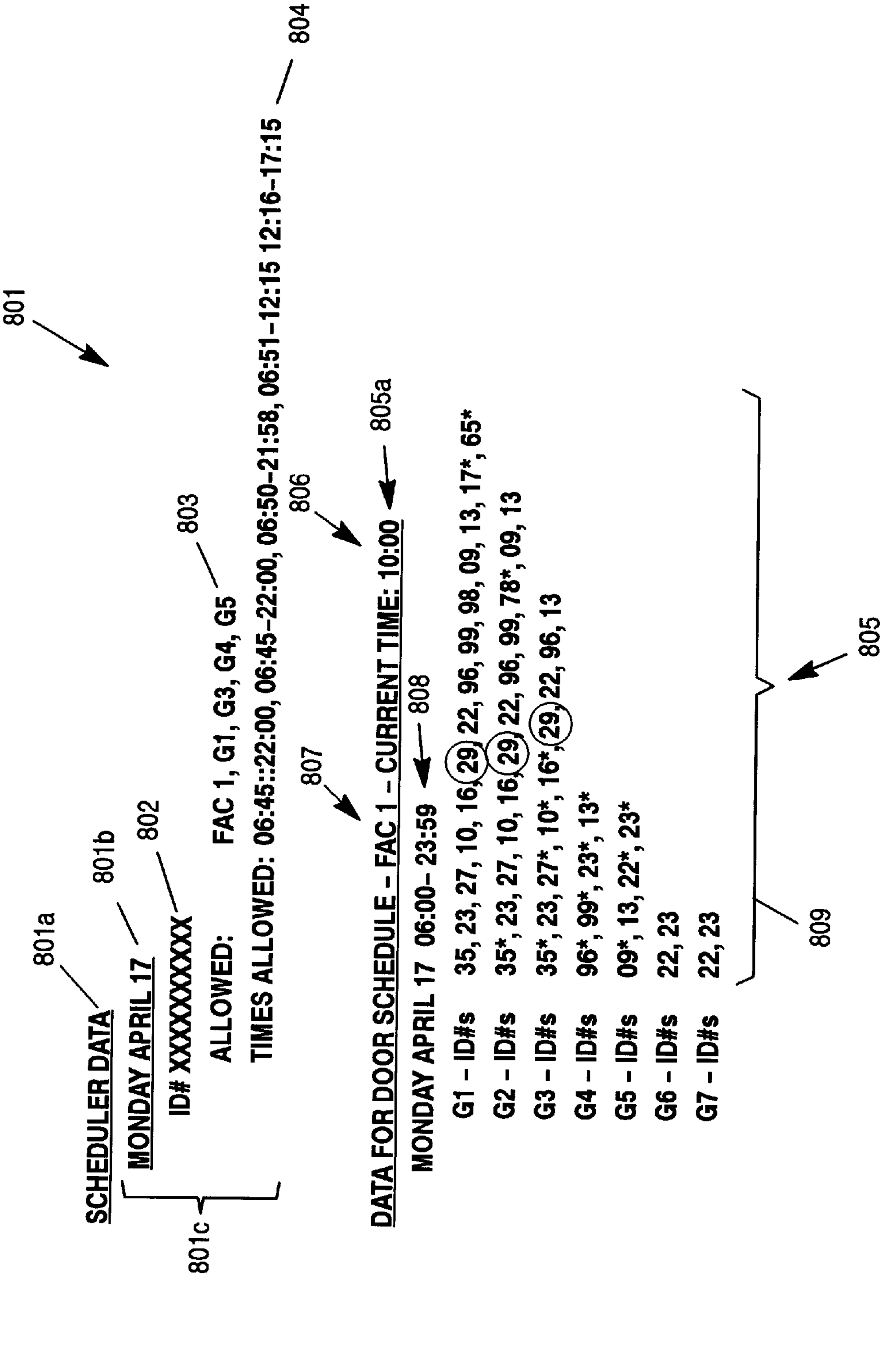
FIG. 8 is an illustration of data organized in databases for an individual enrollee and for an individual facility in accord with a preferred form of the invention.

In some embodiments, a guard or a person at the enrollment center will be entitled to see compilations of data similar to the data described in FIG. 8 at 805. In this data for the doors of the facility, a list of individuals, indicated only by their ID numbers, is shown—one door at a time. In individual compilations in accord with the preferred embodiment, these ID numbers will be hidden, but names of individuals will be presented to humans (such as guards or authorities at the enrollment facility) who may read this or similar displays.

This display is for Monday, April 17, and covers the hours 0600 to 2399. Individuals with circles around their identity (here "29") would be allowed past the guard desk and into zone 1 only, for example. Starred individual numbers on this display indicate the present location of a particular individual. Individuals with ID numbers 17 and 65 in this example could very well be guards since they are only within gate G1 and are presently located in the guard area.

This compilation can be drawn from accessing each individual's schedule. In the preferred embodiment, such detail would only be provided on a need to know basis, and only to authorized parties.

Figure 6:
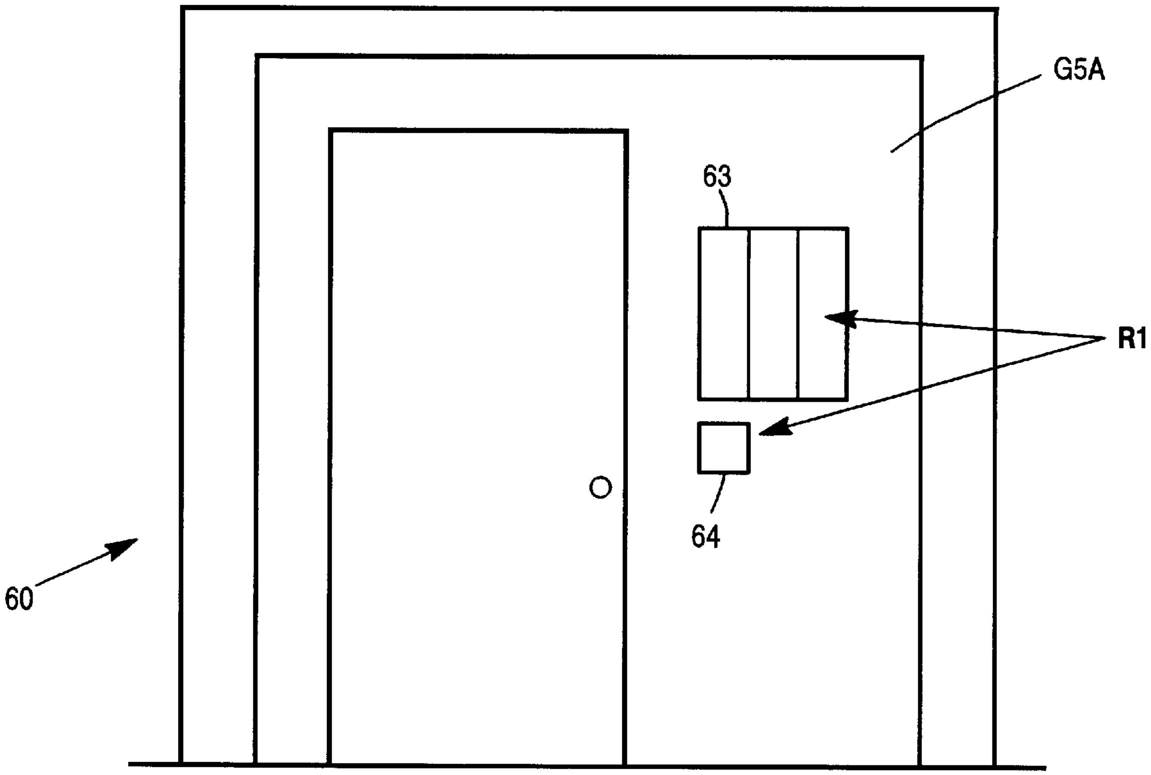
FIG. 6 is an illustration of a door with appropriate biometric and card reader facilities in accord with a preferred form of the invention.
Figure 7:
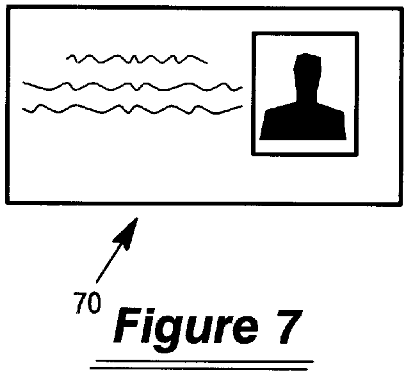
FIG. 7 is an illustration of a card for use with this invention.

Refer now to FIG. 6 in which one of the doors G5 is illustrated in the hallway 60. The card reader and identity assembly here includes an iris scanning device 63 and a card reader 64. The individual walking down the hallway should not be able to determine were the intelligence of the system is located. An ID card 70 is also illustrated in FIG. 7.

At the present time, the preferred system uses an Iridian R1, available from Iridian Technologies, Inc. of Marlton, N.J. (formerly IriScan), but for purposes of this invention, any biometric measuring device that extracts data that can be reliably compared to subsequent biometric readings from equivalent biometric measuring devices to positively identify individuals would be acceptable. The "R1" is a camera and control mechanism that locates a face and an eye (right or left or both if desired) within that face, and then photographs the iris and extracts from the image a biometric value. The International Biometric Industry Association has published a list of effective biometric technologies currently available at www.ibia.org/Press%20Release%20116.htm, but the list is not believed to exhaust the potential biometric measurements that could be used with this invention. The IBIA suggestions include facial recognition, fingerprint minutiae, hand geometry, iris recognition, and signature dynamics, and the inventors suggest that as technology improves these and other measurable biometrics, together or independently, will be useful in the context of the present invention.

Figure 9:
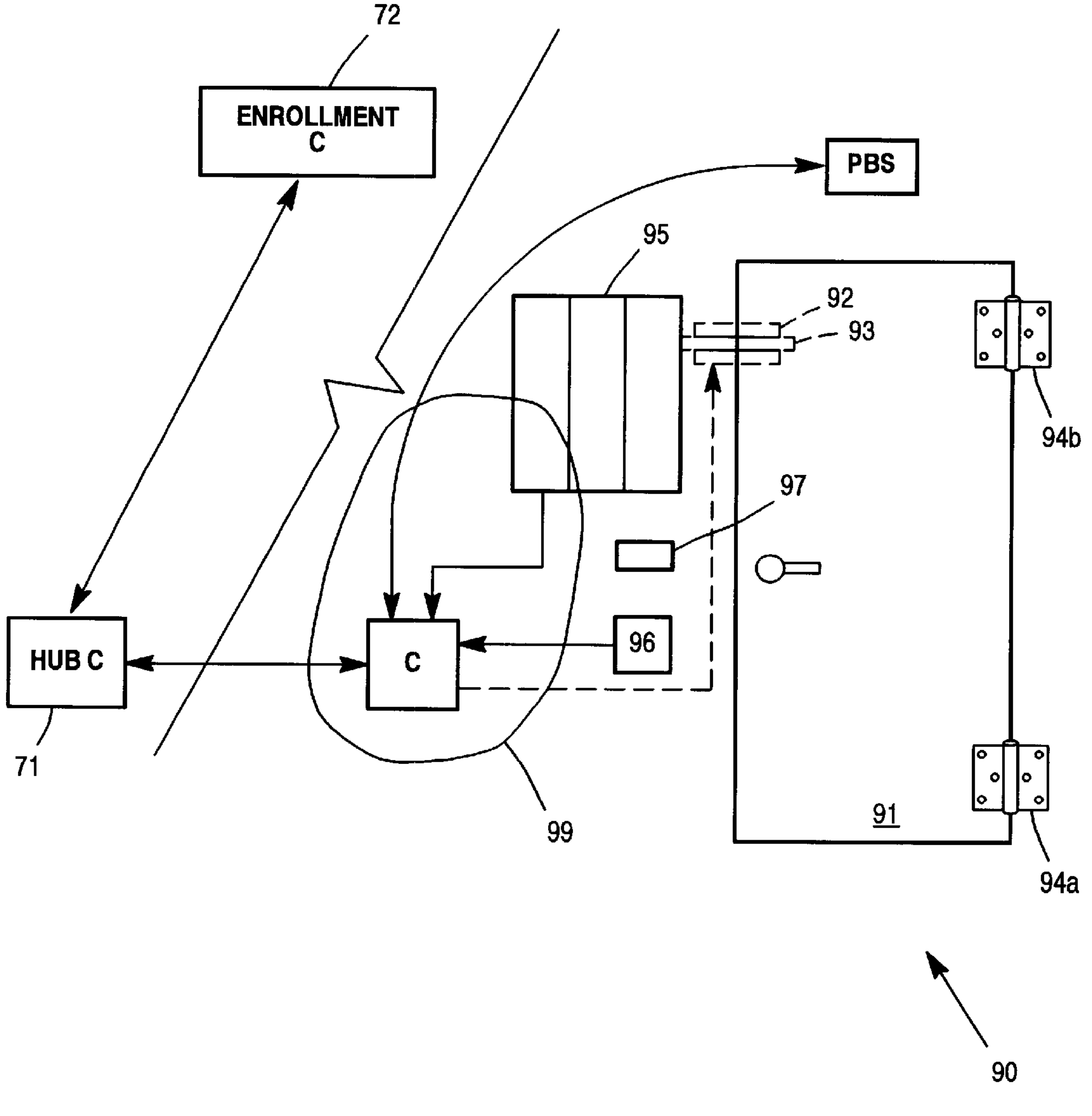
FIG. 9 is a heuristic diagram of local system components in accord with a preferred embodiment of the invention.

Please refer now to FIG. 9 in which the inventive system components are illustrated as a system 90. Here, the door 91 has a locking mechanism 92 with a deadbolt 93 to hold it closed unless an actuation system in the locking mechanism is activated by a signal sent to it from an on-site decision-making computer system 98. A biometric identity reader 95 and ID token reader 96 as well as additional biometric measuring device 97 are all connected to the decision-making computer system 98. Additionally, piggyback detection systems (which may use additional surveillance to determine if someone is attempting to pass two or more individuals with one identity and schedule validation) and various other security devices (such as one that automatically traps a person between two doors if he is attempting unauthorized passage, or automatic crosschecking against most recent changeable biometrics using passive sensor or video technologies) may also be connected to the decision-making computer system 98. The door itself is on hinges **94*a* and 94*b* and the computer system 98 is hidden behind a wall exposed in area 99. The computer system will require in most embodiments a connection through a hub system 71 in order to reach the enrollment center 72** for the information required as described previously.

Figure 10:
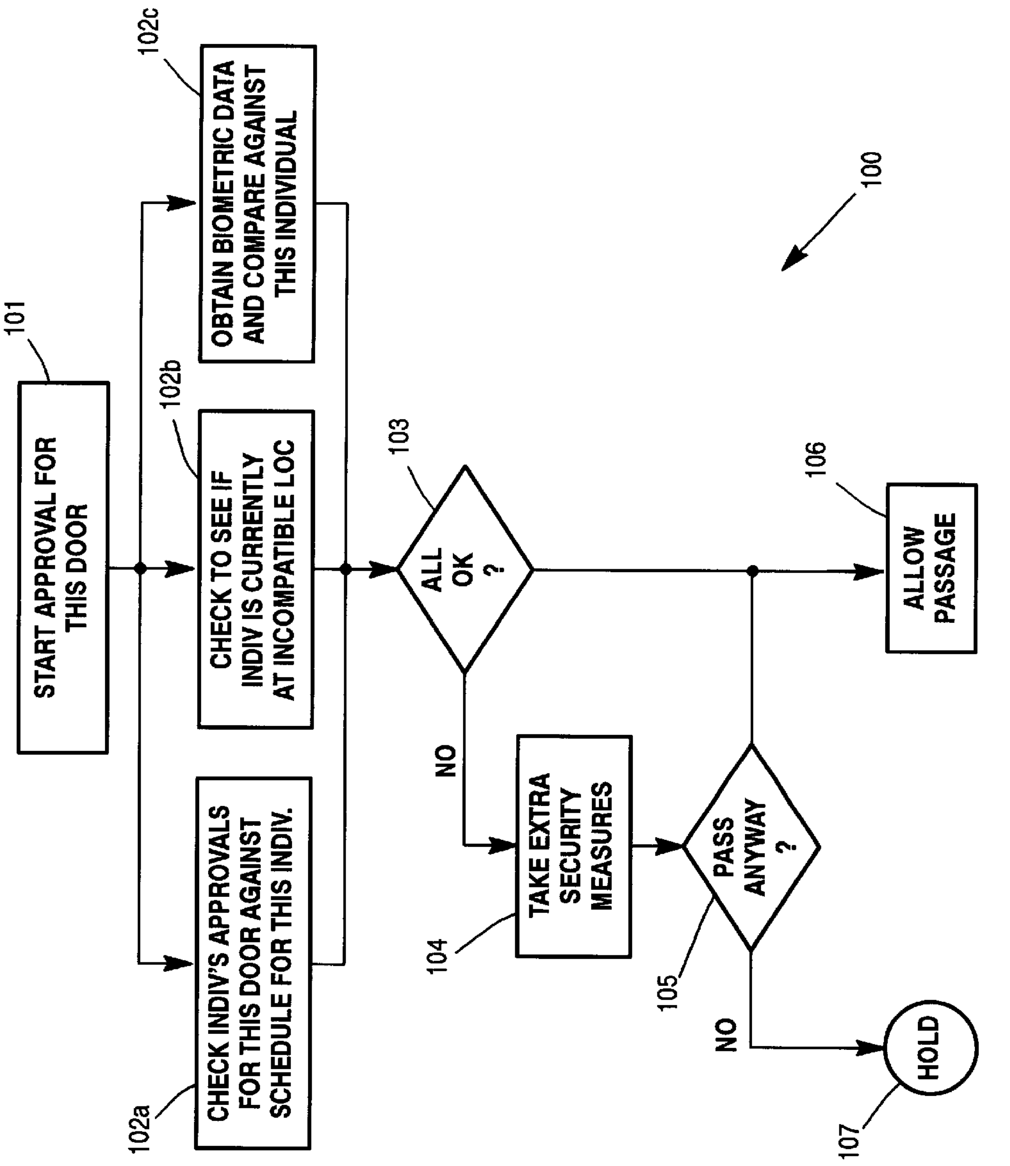
FIG. 10 is a flowchart consistent with a preferred form of the invention.

In FIG. 10, a summary of the process 100 for determining whether to pass an individual through a gate in a preferred embodiment system is described, starting with a check 101 by the computer system at the door which will make the decision whether to admit the individual or not. In this step, the individual will present him or her self to the biometric reader and use the ID card to allow the decision-making computer to get the appropriate biometric for the individual from the enrollment center computer system. (While it may in some situations be preferable to use an ID card with biometric information encoded in it, such as the encoding capabilities of LaserCard or SmartCard technologies, we believe that it is currently preferable to use a central database for this information. That is not to say that a biometric data card could not supplement the central data base for certain situations or be used as an alternative embodiment altogether, just that it is not preferred at this time. If the biometric on the card is used, the system should still match the human's biometric reading against the stored record in a database for heightened security.)

The local decision-making computer performs at least one and in most preferred embodiments, several, evaluations 103 to determine whether the person seeking access should be granted or denied passage. In one part **102*a*, the computer will access the presented individual's schedule. Again, the individual will preferably have approved this schedule from a secure terminal using the same ID card and another biometric scan approval as described with reference to FIG. 11**, or the schedule can be one set up by the authorities, if desired. The schedule the individual sets up will also have been approved by the enrollment authority and the individual will not be able to schedule himself into a facility for which he has no clearance.

If the check of the schedule and the biometric (checked in step **102*c*) provide affirmative access qualification responses for the individual, the local decision-making computer will also initiate a check to be sure that this individual is not in a different location 102*b*. Preferably each local computer will have a record of who is located within its Zone, although a central computer either at each facility or in the secure enrollment facility could perform this function. The guard may or may not have access to such information as may be desired by the system designer. Refer briefly back to FIGS. 5 and 8 in which it can be seen that an individual could not be present in Zone 2 and be seeking passage into Zone 5 without causing an unacceptable condition to occur. If such a condition does occur, the local guard and the enrollment facility should receive automated notification from the computer equipment at the door to Zone 5. As mentioned before, the history record of the individual will also be affected by each contact with a door. With reference to FIG. 5 it is difficult to see how the particular Zone 2/Zone 5 situation just mentioned could occur, but with only one exit between say, Zone 3 and Zone 2**, if the individual exited without providing a card swipe or other record event of his leaving one of these two zones before entering the other, it is easy to see how such an access violation could occur. Accordingly, it is important to provide an easy egress method which each individual will use to exit any secure Zone to reduce the number of false security access breach reports that may be generated. The use of highly accurate biometric identity validation techniques (such as iris recognition) is recommended for safeguarding access to facilities and zones within, whereas simple card swipes or low-cost handprint biometrics scans are typically adequate for conveying egress from zones and facilities.

Additional steps like steps 102*a–c* may be included in which the decision-making computer at the door may also poll auxiliary systems to check for input from piggyback prevention sensors, metal detectors, or similar facilities that may have important information. The computer at the door may also take any extra security measurers 104, up to and possibly including preventing passage by trapping an individual between two doors it may control, and initiate any trace function that may be required for this individual. In many circumstances, the local computer may permit passage even if the decision in step 103 is "NO", to avoid alerting the individual to the fact that the authorities know something is amiss. To illustrate such a potential for this system a decision step 105 is included, and the decision to deny passage through the door is shown as a hold step 107. If there is a hold 107, or if the answer to decision step 103 is "NO", some signal or alarm should be sent to the high security enrollment facility, and in some circumstances the local guard desk as well. If no alarm condition signal is sent because all appropriate matches are made and the individual is entitled to pass, a positive entry signal can be generated which can be used to update history files, identify where the person is and the like. The generation of an alarm signal, as mentioned in other places herein, need not be a determinant that the individual may not enter the high security zone through the door, for various reasons related to design of the entire security system.

Finally in step 106 the individual is allowed to pass, and any additional information garnered during the passage preferably will be maintained in the person's history file and in a record of who is in the zone beyond the involved door.

Figure 11:
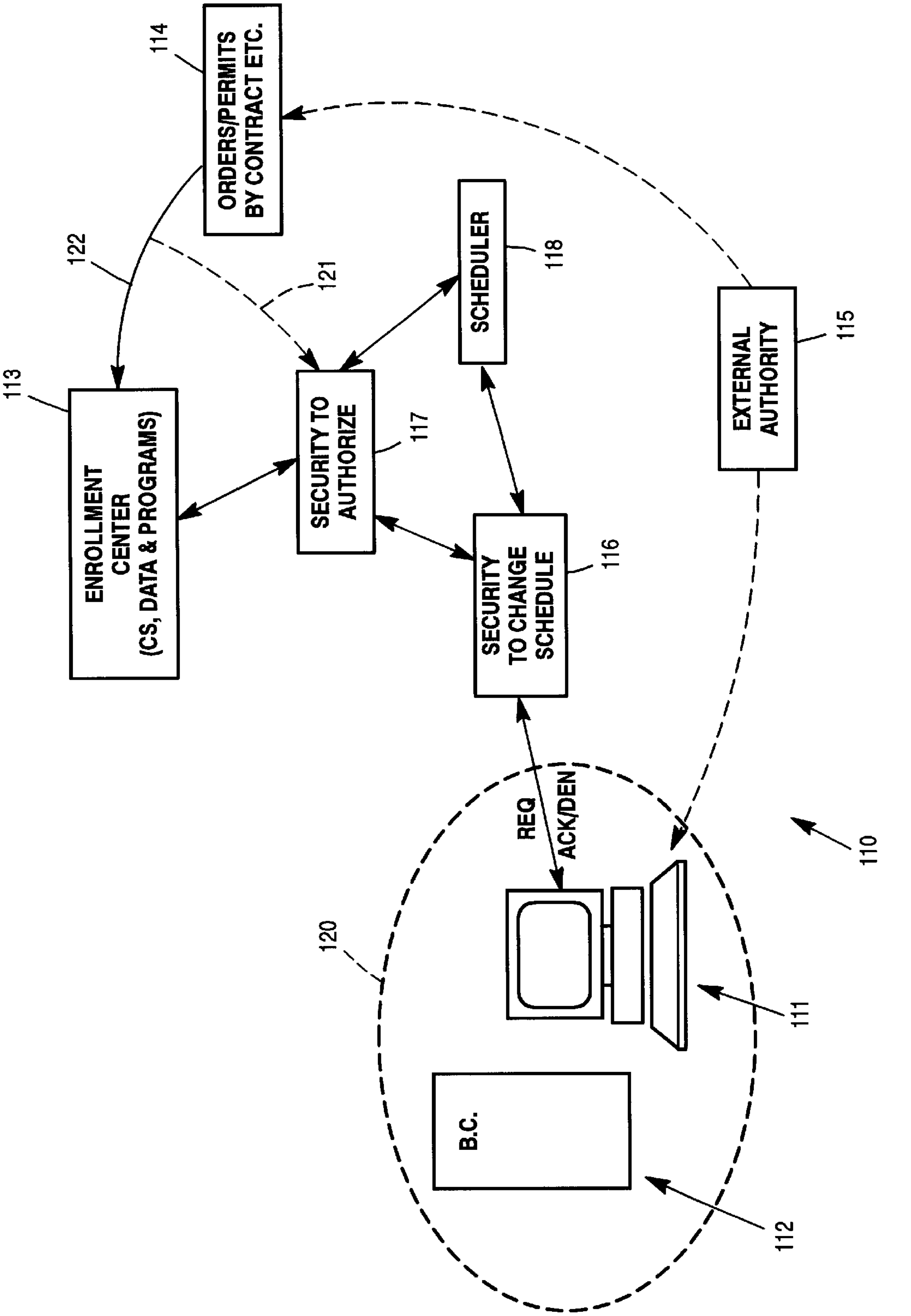
FIG. 11 is a heuristic block diagram illustrating various logical components for modifying an individual's schedule in accord with a preferred embodiment of the invention.

It should be clear that many of the benefits of the system described herein require reference to a secure schedule program. Refer now to FIG. 11 in which the logical components of the system 110 around the scheduling program 118 are illustrated. Assume that an individual needs to change his schedule. If the individual has access to a secure terminal or other computer interface 120, the individual may be able to alter his own schedule. It is preferable that the secure terminal or other computer interface 120 has both an input console 111 and a biometric checking facility 112. A secure line (a hard-wired line, line-of-sight communication or other encrypted communications facility would be preferred) to a "Security to Change Schedule Program" 116 hosted on a secure computer system (not shown) would be advantageous as well. As with the Scheduler 118, the program 116 may advantageously be located within the enrollment authority computer systems, but need not be. The individual making the request to change schedule within the secure facility system for which the invention is responsible for access control, will make a request (REQ) to the program 116, and may receive an acknowledgement of acceptance or denial of the request (ACK/DEN). Of course, the program 116 cannot simply base its decision to modify the schedule on its own. In most highly secure systems there is a rules-based decision making activity based on both security level and need to know. Even if the individual has sufficient security to access the system 120 and make REQs, that individual must still be granted the authority to do so through a need to know type authorization check. The figure illustrates using an external authority 115 connected by a relationship to the user (dotted line to 120 from 115), and a granting of authorization 114 to the enrollment center authority 113, which passes an authorization down to the "Security to Change Schedule Program" 116. The external authority 115 can be the command structure in a military organization, it can be the procurement personnel in a commercial entity with an appropriate contract, with or without a redundant authority supervising the grant of authorization in the enrollment center 113 or in some other oversight organization, or any similar arrangement may be acceptable to one implementing the system. It should be noted that there are two routes for this authority to get to the "Security to Change Schedule Program" 116. The more secure route is to let the orders or other authorization 114 go through the enrollment center 113 through path 122. This gives the enrollment center an opportunity to provide oversight. However, if the program that gives security clearance to authorize 117 a change in schedule maintains and provides access to data on schedule change authorizations, or if less security is required, path 121 may be acceptable.

The program that grants security to authorize changes to schedule 117 preferably grants that authority to both the "Security to Change Schedule Program" 116 and the scheduler 118 itself. In this way, a problem at either program 117 or program 116 can disallow a change in schedule by the scheduler 118.

All the lines and connectors may be chosen in order to be better suited to more effective, secure, or inexpensive communications as may be available, known and desired by the designer, purchaser and installer of the system. Thus, the invention requires no particular connection methodology or signal transfer structure (wireless, optical, USB, or other particular system) to operate so long as it can accomplish the signal communication tasks described in this document.

In this disclosure, the term "security" or "secure" refers to the commonly understood sense used in the Security Industry, to wit, that some security feature has been added which gives some level of confidence that the item referred to as "secure" is in fact likely to be secure. As no security feature is ever believed to be impenetrable, this reminder definition should be kept in mind when interpreting the claims.

Accordingly, the scope of the invention is only limited by the following appended claims.

What is claimed is:

1. A system for maintaining access control to a plurality of high security zones by at least one controlled door and in the vicinity of said at least one door, and by at least one local decision-making computer for controlling access to said at least one door, a one of said at least one doors and a one of said at least one decision-making computers being associated with each of said plurality of high security zones, all within a high security facility system, said system for maintaining access control comprising;

a. an enrollment authority which may be in at least one secure facility, for obtaining and maintaining on a secure computer system biometric data files for each individual who may be allowed access to any said high security zone within said high security facility system, b. a direct tentative identifier device associated with a one of said doors and an associated one of said decision-making computers, for reading an ID token of a presenting individual and for sending an ID code related to said ID token to said associated one of said decision-making computers, c. a biometric reader associated with said one of said doors and said associated one of said decision-making computers, for reading a live biometric from said presenting individual, said biometric reader being connected to said associated decision-making computer so as to enable the comparing of live biometric data read from said presenting individual with biometric data maintained on said secure computer system, d. a secure communication path for secure communication of biometric data from said local decision-making computer providing control over said door to said secure computer system of said enrollment authority, e. a scheduler for maintaining a schedule for each individual allowed access to any of said high-security zones within said high security facility system having a secure line for communication to said local decision-making computer, said scheduler providing an indication of whether said presenting individual that is presenting for a live biometric reading is permitted access to a door associated with a high-security zone associated with said door.

2. The system of claim 1 wherein said direct tentative identifier device is a magnetic card reader and said ID token is a magnetic ID card.

3. The system of claim 1 wherein said scheduler comprises a database having data values indicating whether an individual is authorized to enter a high security zone.

4. The system of claim 1 wherein said biometric data files are encrypted.

5. The system of claim 1 wherein more than a single biometric reader is located at said secure door.

6. The system of claim 5 wherein one of said more than a single biometric reader is located proximate to said door to generate a signal indicating that an individual related to an ID code has gone out a said zone through said secure door so as to allow for the recording of said individual's egress through said secure door.

7. The system of claim 5 wherein said more than a single biometric reader is located proximate to said door and connected to provide a second live biometric to said associated decision-making computer for comparison with a second biometric data file for a presenting individual.

8. The system of claim 1 wherein said ID card reader is a magnetic swipe reader.

9. The system of claim 1 wherein a second ID card reader is provided at exits from inside said high-security zones for enabling the recording of individual egress from such secure zones.

10. The system of claim 1 wherein a database relates ID codes biometric data files.

11. The system of claim 1 further comprising a trace system for obtaining present information about the presenting individual at such time as said presenting individual is present at said door and for recording said present information for later use.

12. The system of claim 1 further comprising means for generating a bad match alarm signal if said decision making computer determines that there is no match between said live biometric and said archived biometric.

13. A system for maintaining access control to a plurality of high-security zones by at least one controlled door and in the vicinity of said at least one door, and by at least one local decision-making computer for controlling access to said at least one door, a one of said one of said at least one doors and a one of said at least one decision-making computers being associated with each of said plurality of high security zones, and having an enrollment authority for obtaining and maintaining on a computer system biometric data files for each individual who may be allowed access to any said high security zone within said high security facilities, all within a high security facility system, said system for maintaining access control comprising;

a. an individual recognition device for determining that an individual is at a said door and for taking a live reading of such a presenting individual's biometric, b. a door control computer for deciding whether the live biometric reading is a match to the biometric data file in said enrollment authority that can be related to said individual, c. a scheduler for maintaining a secure knowledge base relating access privileges of said individual to said door, and d. a lock mechanism responsive to computer commands from said door control computer for allowing or disallowing passage through said door.

14. The system of claim 13 wherein said scheduler is connected to an enrollment authority and wherein no data within said secure knowledge base can be modified without an approval signal from said enrollment authority.

15. The system of claim 14 wherein said scheduler is connected to receive secure data requests from individuals who have a relationship to said data which requests modification of said data.

16. The system of claim 14 wherein said scheduler knowledge base contains data related to particular times at which particular individuals are authorized to have access to particular ones of said high security zones.

17. A method for maintaining a secure facility of high-security zones having a door to provide access to each said high-security zone and a decision-making computer for controlling actuators that permit use of said doors and having means for allowing for identification of an individual at a one of said doors by reading biometric of said individual at said door by a biometric reader that produces a live biometric data signal, said method comprising:

a. by a direct tentative identifier device, tentatively identifying said individual at said door by said direct means b. producing a present ID code signal from said tentative identification, c. comparing said live biometric data signal to an archived biometric data signal related to an archived ID code signal that matches said present ID code signal, d. determining whether said live and archived biometric data signal are a match, e. determining whether said individual identified by said present ID code and said matched live and archived biometric data signal is permitted by a scheduler to pass through said door, f. generating an alarm condition signal if any of steps c, d, or e fail to produce a positive result.

18. The method of claim 17 further comprising activating follow-on systems for tracing said individual at said door and recording information related to him.

19. The method of claim 17 wherein upon the occurrence of a generating of an alarm condition signal, said individual at said door is not permitted to pass through said door.

20. The method of claim 17 wherein said alarm condition signal is sent to a guard desk system when it is generated.

* * * * *